No. 607,115. Patented July 12, 1898.
F. J. HALL.
TOOL HANDLE.
(Application filed Nov. 26, 1897.)
(No Model.)

Witnesses.
Richard H. Dyner
J. Peter Dejon

Inventor.
Fred J. Hall
by Chapman and Hall
Attorneys

UNITED STATES PATENT OFFICE.

FRED J. HALL, OF WALLINGFORD, CONNECTICUT.

TOOL-HANDLE.

SPECIFICATION forming part of Letters Patent No. 607,115, dated July 12, 1898.

Application filed November 26, 1897. Serial No. 659,936. (No model.)

*To all whom it may concern:*

Be it known that I, FRED J. HALL, a citizen of the United States, residing at Wallingford, county of New Haven, State of Connecticut, have invented a new and useful Tool, of which the following is a specification.

The object of my invention is to provide a handy combination household tool at the price of either tool separate.

Figure 1:
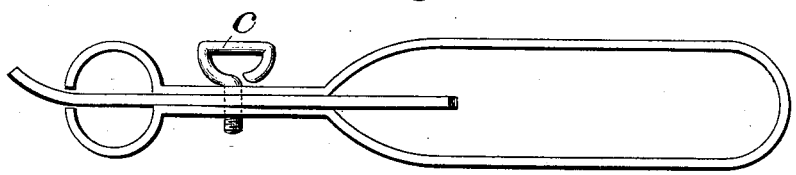
Figure 2:
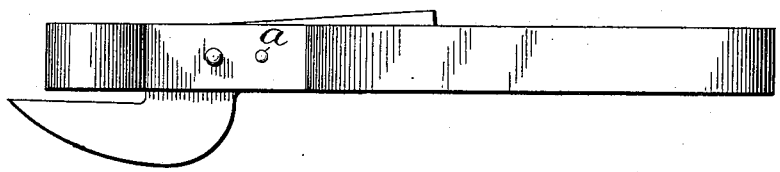
Figure 3:
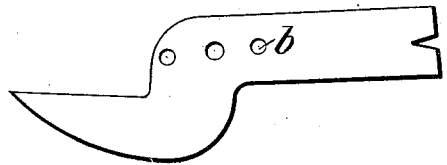

Figure 1 shows the tool as a tack-puller, Fig. 2 as a can-opener, and Fig. 3 shows the blade separate.

It can readily be seen that when the tack-puller is in position the fulcrum is much larger than usual, thereby enabling one to lift a tack out straight, which is a great advantage over those in use. Then by simply turning the set-screw $c$ backward the handle springs open and the other end revolves into position.

The tool is secured in position by a teat $a$ being forced out of the handle itself, as shown at Fig. 2. Then when the tool is in position, as shown at Fig. 2, this teat $a$ goes in the hole $b$. (Shown on Fig. 3.) Then by screwing down the set-screw the tool is securely locked.

What I claim is—

1. The combination with a can-opener blade having a shank terminating at its end in a tack-puller, of a handle to which said blade is reversibly connected, said handle having its front end expanded laterally upon opposite sides of the plane of said blade, whereby said expanded end thereof is adapted to serve as a fulcrum both for said can-opener and said tack-puller, substantially as described.

2. The combination with a can-opener blade having a shank terminating in a tack-puller, of a handle having at its front end two flat bars which rest against opposite sides of said blade and a locking-bolt which passes through said bars and said blade, said bars, at their extreme front end, being bent outwardly and then inwardly to a bow shape, whereby they are adapted to serve as a fulcrum both for said can-opener and said tack-puller, substantially as described.

3. The combination with a handle composed at its front end of two flat strips of metal which, at their extreme front end, are bent outwardly and then inwardly to a bow shape, one of said strips being provided with an inward projection, of a can-opener blade having a shank which terminates in a tack-puller, said blade being located between said strips and having two recesses to receive the projection on the latter, and a locking-bolt passing through a hole in one of said strips, and through a hole in said blade, located between the two recesses therein, and through a tapped hole in the opposite strip, substantially as set forth.

FRED J. HALL.

Witnesses:
LEWIS A. NORTHROP,
ELBERT R. ALLEN.